(12) United States Patent
Park et al.

(10) Patent No.: US 11,672,005 B2
(45) Date of Patent: Jun. 6, 2023

(54) TECHNIQUES FOR REPORTING RANK CAPABILITY FOR MULTI TRANSMIT-RECEIVE POINT CONFIGURATION

(71) Applicant: QUALCOMM Incorporated, San Diego, CA (US)

(72) Inventors: Sungwoo Park, Seoul (KR); Xiaoxia Zhang, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 16/949,533

(22) Filed: Nov. 2, 2020

(65) Prior Publication Data
US 2021/0185691 A1 Jun. 17, 2021

Related U.S. Application Data

(60) Provisional application No. 62/948,018, filed on Dec. 13, 2019.

(51) Int. Cl.
*H04W 72/04* (2023.01)
*H04W 72/12* (2023.01)
(Continued)

(52) U.S. Cl.
CPC ..... *H04W 72/563* (2023.01); *H04W 72/0446* (2013.01); *H04W 72/23* (2023.01); *H04W 72/53* (2023.01)

(58) Field of Classification Search
None
See application file for complete search history.

(56) References Cited

U.S. PATENT DOCUMENTS

2019/0239093 A1* 8/2019 Zhang .................. H04W 72/042
2019/0281587 A1* 9/2019 Zhang .................. H04W 72/042
(Continued)

OTHER PUBLICATIONS

Huawei Hisilicon: "Feature Summary of Enhancements on Multi-TRP/Panel Transmission", 3GPP Draft, 3GPP TSG RAN WG1 Meeting #98bis, R1-1911425m FL Summary MTRP 98BIS V2, 3rd Generation Partnership Project (3GPP), Mobile Competence Centre, 650, Route Des Lucioles, F-06921 Sophia-Antipolis Cedex, France, vol. RAN WG1, No. Chongqing. China, Oct. 14, 2019-Oct. 20, 2019, Oct. 22, 2019 (Oct. 22, 2019), XP05179869, 101 Pages, Retrieved from the Internet: URL: https://ftp.3gpp.org/tsg_ran/WG1_RL1/TSGR1_98b/Docs/R1-1911425.zip. R1-1911425 FLSummary MTRP 98bis v2.docx [retrieved-on Oct. 22, 2019]. p. 45. Comments from Nokia and following paragraphs p. 68 comments rom CATT to p. 69 comments from QC p. 75 comments from Fujitsu to p. 78 comments from Intel.

(Continued)

*Primary Examiner* — Sai Aung
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may determine one or more respective maximum ranks for one or more transmission configuration indicator states of the UE; and transmit information identifying the one or more respective maximum ranks. In some aspects, a base station may receive information identifying one or more respective maximum ranks of a UE for one or more TCI states of the UE; and transmit scheduling information for a communication for the UE, wherein the scheduling information is based at least in part on the one or more respective maximum ranks. Numerous other aspects are provided.

34 Claims, 8 Drawing Sheets

(51) Int. Cl.
  *H04W 72/563* (2023.01)
  *H04W 72/0446* (2023.01)
  *H04W 72/23* (2023.01)
  *H04W 72/53* (2023.01)

(56) References Cited

U.S. PATENT DOCUMENTS

| | | | |
|---|---|---|---|
| 2020/0053767 A1* | 2/2020 | Bai | H04W 72/02 |
| 2021/0400700 A1* | 12/2021 | Wang | H04L 5/005 |
| 2022/0007406 A1* | 1/2022 | Matsumura | H04B 7/0602 |
| 2022/0210812 A1* | 6/2022 | Matsumura | H04L 5/0048 |

OTHER PUBLICATIONS

International Search Report and Written Opinion—PCT/US2020/070737—ISA/EPO—dated Jan. 25, 2021.

LG Electronics: "Enhancements on Multi-TRP/Panel Transmission", F44 3GPP Draft, 3GPP TSG RAN WG1 #96, R1-1902091, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599786, 11 Pages, Retrieved from the Internet: URL: http://www.3gpp.org/ftp/tsg%5Fran/WG1%5FRL1/TSGR1%5F96/Docs/R1%2D1902091%2Ezip. [retrieved on Feb. 16, 2019] section 2.2; p. 5-p. 7.

OPPO: "Enhancements on Multi-TRP and Multi-Panel Transmission", 3GPP Draft, 3GPP TSG RAN WG1 Meeting #98bis, R1-1910116, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 4, 2019 (Oct. 4, 2019), XP051808070, 13 pages, Retrieved from the Internet: URL: https://ftp.3gpp.org/tsg_ran/WG1_RL1/TSGR1_98b/Docs/R1-1910116.zip R1-1910116.doc [retrieved on Oct. 4, 2019] p. 6-p. 7.

* cited by examiner

TECHNIQUES FOR REPORTING RANK CAPABILITY FOR MULTI TRANSMIT-RECEIVE POINT CONFIGURATION

CROSS-REFERENCE TO RELATED APPLICATION

This Patent application claims priority to U.S. Provisional Patent Application No. 62/948,018, filed on Dec. 13, 2019, entitled "TECHNIQUES FOR REPORTING RANK CAPABILITY FOR MULTI TRANSMIT-RECEIVE POINT CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for reporting rank capability for a multi transmit-receive point (TRP) configuration.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining one or more respective maximum ranks for one or more transmission configuration indicator (TCI) states of the UE; and transmitting information identifying the one or more respective maximum ranks.

In some aspects, the one or more TCI states are one or more default TCI states of the UE.

In some aspects, the method may include receiving information indicating respective maximum allowable ranks for the one or more TCI states of the UE.

In some aspects, the information indicating the respective maximum allowable ranks is received using at least one of downlink control information, radio resource control signaling, or a medium access control control element.

In some aspects, the method includes receiving scheduling information for a communication with a slot offset that fails to satisfy a threshold, wherein the communication is associated with two or more TCI states, and wherein each TCI state, of the two or more TCI states, has a rank that satisfies the one or more respective maximum ranks and the respective maximum allowable ranks.

In some aspects, the method includes receiving scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks or a corresponding maximum allowable rank for the TCI state; and treating the scheduling information as invalid based at least in part on the TCI state having the rank that exceeds the corresponding maximum rank or the corresponding maximum allowable rank.

In some aspects, the one or more respective maximum ranks indicate respective maximum ranks for all default TCI states of a default TCI state set of the UE.

In some aspects, the information identifying the one or more respective maximum ranks is transmitted using at least one of uplink control information, radio resource control signaling, or a medium access control control element.

In some aspects, the method may include receiving scheduling information for a communication with a slot offset that fails to satisfy a threshold, wherein the communication is associated with two or more TCI states, and wherein each TCI state, of the two or more TCI states, has a rank that satisfies the one or more respective maximum ranks; and receiving the communication based at least in part on the scheduling information.

In some aspects, the method may include receiving scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks; and treating the scheduling information as invalid based at least in part on the TCI state having the rank that exceeds the corresponding maximum rank.

In some aspects, a method of wireless communication, performed by a base station, may include receiving information identifying one or more respective maximum ranks of a UE for one or more TCI states of the UE; and transmitting scheduling information for a communication for the UE, wherein the scheduling information is based at least in part on the one or more respective maximum ranks.

In some aspects, the one or more TCI states comprise one or more default TCI states.

In some aspects, the method includes transmitting information indicating respective maximum allowable ranks for the one or more TCI states of the UE.

In some aspects, the information indicating the respective maximum allowable ranks is transmitted using at least one of downlink control information, radio resource control signaling, or a medium access control control element.

In some aspects, the communication has a slot offset that fails to satisfy a threshold, the communication is associated with two or more TCI states, and each TCI state, of the two or more TCI states, has a rank that satisfies the one or more respective maximum ranks and the respective maximum allowable ranks.

In some aspects, the one or more respective maximum ranks include respective maximum ranks for all default TCI states of a default TCI state set of the UE.

In some aspects, the information identifying the one or more respective maximum ranks is transmitted using at least one of uplink control information, radio resource control signaling, or a medium access control control element.

In some aspects, the communication has a slot offset that fails to satisfy a threshold, the communication is associated with two or more TCI states, and each TCI state, of the two or more TCI states, has a rank that satisfies the one or more respective maximum ranks.

In some aspects, a UE for wireless communication may include memory and one or more processors operatively coupled to the memory. The memory and the one or more processors may be configured to determine one or more respective maximum ranks for one or more TCI states of the UE; and transmit information identifying the one or more respective maximum ranks.

In some aspects, the one or more TCI states are one or more default TCI states of the UE.

In some aspects, the one or more processors may receive information indicating respective maximum allowable ranks for the one or more TCI states of the UE.

In some aspects, the information indicating the respective maximum allowable ranks is received using at least one of downlink control information, radio resource control signaling, or a medium access control control element.

In some aspects, the one or more processors may receive scheduling information for a communication with a slot offset that fails to satisfy a threshold, wherein the communication is associated with two or more TCI states, and each TCI state, of the two or more TCI states, has a rank that satisfies the one or more respective maximum ranks and the respective maximum allowable ranks.

In some aspects, the one or more processors may receive scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks or a corresponding maximum allowable rank for the TCI state. The one or more processors may treat the scheduling information as invalid based at least in part on the TCI state having the rank that exceeds the corresponding maximum rank or the corresponding maximum allowable rank.

In some aspects, the one or more respective maximum ranks indicate respective maximum ranks for all default TCI states of a default TCI state set of the UE.

In some aspects, the information identifying the one or more respective maximum ranks is transmitted using at least one of uplink control information, radio resource control signaling, or a medium access control control element.

In some aspects, the one or more processors may receive scheduling information for a communication with a slot offset that fails to satisfy a threshold, wherein the communication is associated with two or more TCI states, and wherein each TCI state, of the two or more TCI states, has a rank that satisfies the one or more respective maximum ranks. The one or more processors may receive the communication based at least in part on the scheduling information.

In some aspects, the one or more processors may receive scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks. The one or more processors may treat the scheduling information as invalid based at least in part on the TCI state having the rank that exceeds the corresponding maximum rank.

In some aspects, a base station for wireless communication may include memory and one or more processors operatively coupled to the memory. The memory and the one or more processors may be configured to receive information identifying one or more respective maximum ranks of a UE for one or more TCI states of the UE; and transmit scheduling information for a communication for the UE, wherein the scheduling information is based at least in part on the one or more respective maximum ranks.

In some aspects, the one or more TCI states comprise one or more default TCI states.

In some aspects, the one or more processors may transmit information indicating respective maximum allowable ranks for the one or more TCI states of the UE.

In some aspects, the information indicating the respective maximum allowable ranks is transmitted using at least one of downlink control information, radio resource control signaling, or a medium access control control element.

In some aspects, the communication has a slot offset that fails to satisfy a threshold, the communication is associated with two or more TCI states, and each TCI state, of the two or more TCI states, has a rank that satisfies the one or more respective maximum ranks and the respective maximum allowable ranks.

In some aspects, the one or more respective maximum ranks include respective maximum ranks for all default TCI states of a default TCI state set of the UE.

In some aspects, the information identifying the one or more respective maximum ranks is transmitted using at least one of uplink control information, radio resource control signaling, or a medium access control control element.

In some aspects, the communication has a slot offset that fails to satisfy a threshold, the communication is associated with two or more TCI states, and each TCI state, of the two or more TCI states, has a rank that satisfies the one or more respective maximum ranks.

In some aspects, a non-transitory computer-readable medium may store one or more instructions for wireless communication. The one or more instructions, when executed by one or more processors of a UE, may cause the one or more processors to: determine one or more respective maximum ranks for one or more TCI states of the UE; and transmit information identifying the one or more respective maximum ranks.

In some aspects, the one or more TCI states are one or more default TCI states of the UE.

In some aspects, the one or more instructions cause the UE to receive information indicating respective maximum allowable ranks for the one or more TCI states of the UE.

In some aspects, the information indicating the respective maximum allowable ranks is received using at least one of downlink control information, radio resource control signaling, or a medium access control control element.

In some aspects, the one or more instructions cause the UE to receive scheduling information for a communication with a slot offset that fails to satisfy a threshold, wherein the communication is associated with two or more TCI states, and wherein each TCI state, of the two or more TCI states, has a rank that satisfies the one or more respective maximum ranks and the respective maximum allowable ranks.

In some aspects, the one or more instructions cause the UE to receive scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks or a corresponding maximum allowable rank for the TCI state. The one or more instructions cause the UE to treat the scheduling information as invalid based at least in part on the TCI state having the rank that exceeds the corresponding maximum rank or the corresponding maximum allowable rank.

In some aspects, the one or more respective maximum ranks indicate respective maximum ranks for all default TCI states of a default TCI state set of the UE.

In some aspects, the information identifying the one or more respective maximum ranks is transmitted using at least one of uplink control information, radio resource control signaling, or a medium access control control element.

In some aspects, the one or more instructions cause the UE to receive scheduling information for a communication with a slot offset that fails to satisfy a threshold, wherein the communication is associated with two or more TCI states, and wherein each TCI state, of the two or more TCI states, has a rank that satisfies the one or more respective maximum ranks. The one or more instructions may cause the UE to receive the communication based at least in part on the scheduling information.

In some aspects, the one or more instructions cause the UE to receive scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks. The one or more instructions may cause the UE to treat the scheduling information as invalid based at least in part on the TCI state having the rank that exceeds the corresponding maximum rank.

In some aspects, a non-transitory computer-readable medium may store one or more instructions for wireless communication. The one or more instructions, when executed by one or more processors of a base station, may cause the one or more processors to: receive information identifying one or more respective maximum ranks of a UE for one or more TCI states of the UE; and transmit scheduling information for a communication for the UE, wherein the scheduling information is based at least in part on the one or more respective maximum ranks.

In some aspects, the one or more TCI states comprise one or more default TCI states.

In some aspects, the one or more instructions cause the base station to transmit information indicating respective maximum allowable ranks for the one or more TCI states of the UE.

In some aspects, the information indicating the respective maximum allowable ranks is transmitted using at least one of downlink control information, radio resource control signaling, or a medium access control control element.

In some aspects, the communication has a slot offset that fails to satisfy a threshold, the communication is associated with two or more TCI states, and each TCI state, of the two or more TCI states, has a rank that satisfies the one or more respective maximum ranks and the respective maximum allowable ranks.

In some aspects, the one or more respective maximum ranks include respective maximum ranks for all default TCI states of a default TCI state set of the UE.

In some aspects, the information identifying the one or more respective maximum ranks is transmitted using at least one of uplink control information, radio resource control signaling, or a medium access control control element.

In some aspects, the communication has a slot offset that fails to satisfy a threshold, the communication is associated with two or more TCI states, and each TCI state, of the two or more TCI states, has a rank that satisfies the one or more respective maximum ranks.

In some aspects, an apparatus for wireless communication may include means for determining one or more respective maximum ranks for one or more TCI states of the apparatus; and means for transmitting information identifying the one or more respective maximum ranks.

In some aspects, the one or more TCI states are one or more default TCI states of the UE.

In some aspects, the apparatus may include means for receiving information indicating respective maximum allowable ranks for the one or more TCI states of the apparatus.

In some aspects, the information indicating the respective maximum allowable ranks is received using at least one of downlink control information, radio resource control signaling, or a medium access control control element.

In some aspects, the apparatus includes means for receiving scheduling information for a communication with a slot offset that fails to satisfy a threshold, wherein the communication is associated with two or more TCI states, and wherein each TCI state, of the two or more TCI states, has a rank that satisfies the one or more respective maximum ranks and the respective maximum allowable ranks.

In some aspects, the apparatus includes means for receiving scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks or a corresponding maximum allowable rank for the TCI state; and means for treating the scheduling information as invalid based at least in part on the TCI state having the rank that exceeds the corresponding maximum rank or the corresponding maximum allowable rank.

In some aspects, the one or more respective maximum ranks indicate respective maximum ranks for all default TCI states of a default TCI state set of the apparatus.

In some aspects, the information identifying the one or more respective maximum ranks is transmitted using at least one of uplink control information, radio resource control signaling, or a medium access control control element.

In some aspects, the apparatus may include means for receiving scheduling information for a communication with a slot offset that fails to satisfy a threshold, wherein the communication is associated with two or more TCI states, and wherein each TCI state, of the two or more TCI states, has a rank that satisfies the one or more respective maximum ranks; and receiving the communication based at least in part on the scheduling information.

In some aspects, the apparatus may include means for receiving scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks; and treating the scheduling information as invalid based at least in part on the TCI state having the rank that exceeds the corresponding maximum rank.

In some aspects, an apparatus for wireless communication may include means for receiving information identifying one or more respective maximum ranks of a UE for one or more TCI states of the UE; and means for transmitting scheduling information for a communication for the UE, wherein the scheduling information is based at least in part on the one or more respective maximum ranks.

In some aspects, the one or more TCI states comprise one or more default TCI states.

In some aspects, the apparatus includes means for transmitting information indicating respective maximum allowable ranks for the one or more TCI states of the UE.

In some aspects, the information indicating the respective maximum allowable ranks is transmitted using at least one of downlink control information, radio resource control signaling, or a medium access control control element.

In some aspects, the communication has a slot offset that fails to satisfy a threshold, the communication is associated with two or more TCI states, and each TCI state, of the two or more TCI states, has a rank that satisfies the one or more respective maximum ranks and the respective maximum allowable ranks.

In some aspects, the one or more respective maximum ranks include respective maximum ranks for all default TCI states of a default TCI state set of the UE.

In some aspects, the information identifying the one or more respective maximum ranks is transmitted using at least one of uplink control information, radio resource control signaling, or a medium access control control element.

In some aspects, the communication has a slot offset that fails to satisfy a threshold, the communication is associated with two or more TCI states, and each TCI state, of the two or more TCI states, has a rank that satisfies the one or more respective maximum ranks.

Aspects generally include a method, apparatus, system, computer program product, non-transitory computer-readable medium, user equipment, base station, wireless communication device, transmit/receive point, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
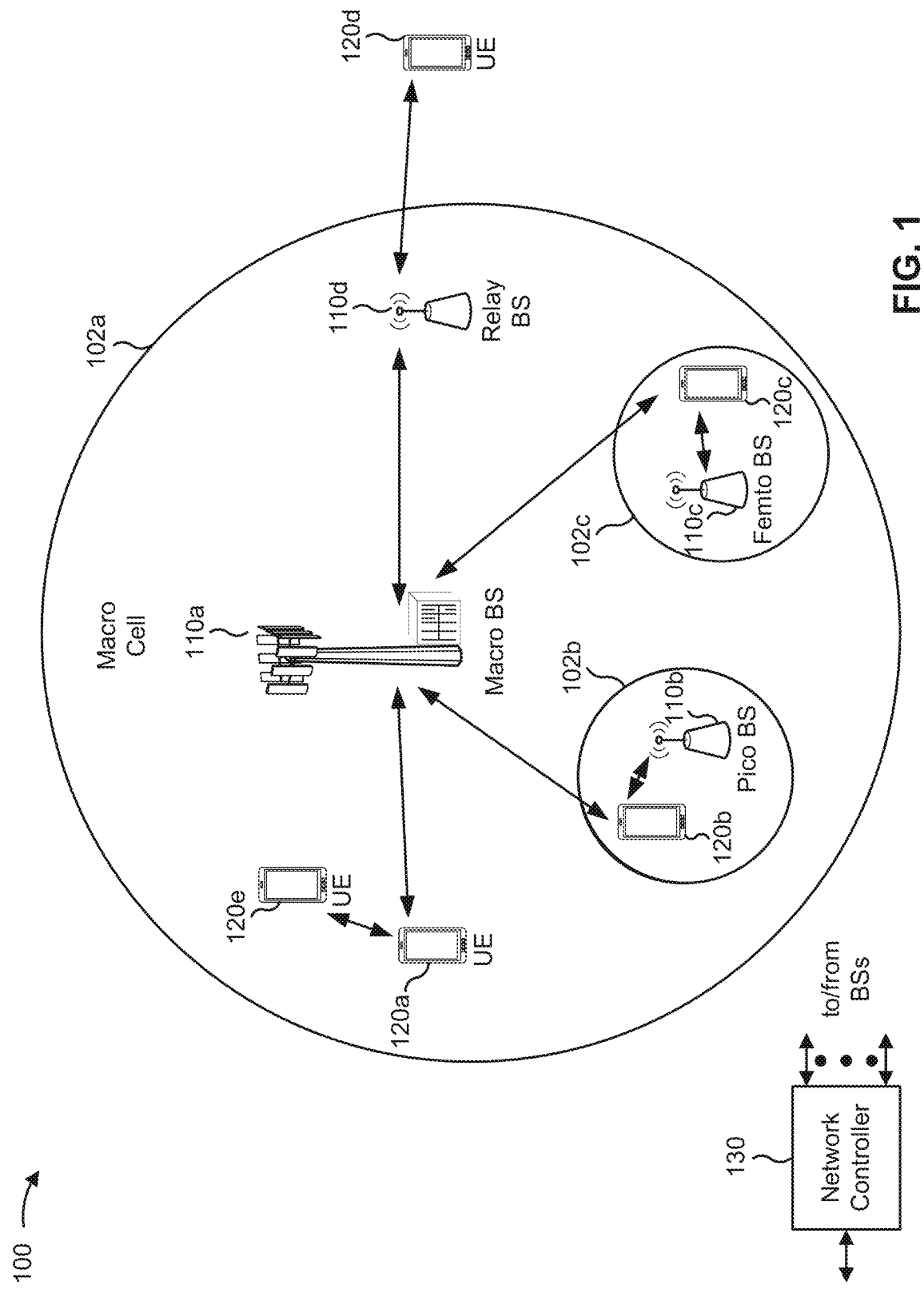
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
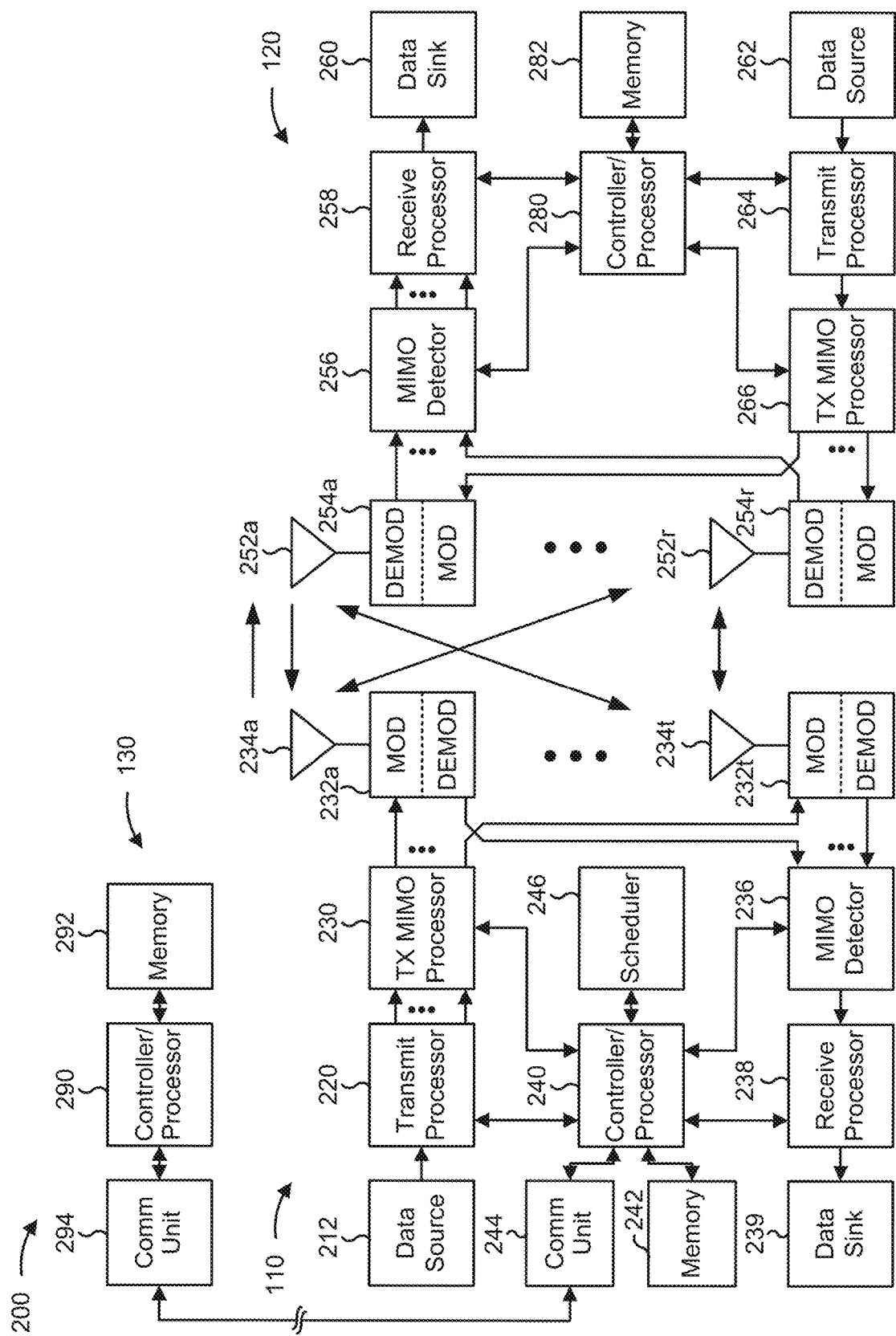
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reporting a rank capability for a multi-TCI state communication, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for determining one or more respective maximum ranks for one or more transmission configuration indicator (TCI) states of the UE; means for transmitting information identifying the one or more respective maximum ranks; means for receiving information indicating respective maximum allowable ranks for the one or more TCI states of the UE; means for receiving scheduling information for a communication with a slot offset that fails to satisfy a threshold, wherein the communication is associated with two or more TCI states, and wherein each TCI state, of the two or more TCI states, has a rank that satisfies the one or more respective maximum ranks and the respective maximum allowable ranks; means for receiving scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks or a corresponding maximum allowable rank for the TCI state; means for treating the scheduling information as invalid based at least in part on the TCI state having the rank that exceeds the corresponding maximum rank or the corresponding maximum allowable rank; means for receiving scheduling information for a communication with a slot offset that fails to satisfy a threshold, wherein the communication is associated with two or more TCI states, and wherein each TCI state, of the two or more TCI states, has a rank that satisfies the one or more respective maximum ranks; means for receiving the communication based at least in part on the scheduling information; means for receiving scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks; means for treating the scheduling information as invalid based at least in part on the TCI state having the rank that exceeds the corresponding maximum rank; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving information identifying one or more respective maximum ranks of a UE for one or more TCI states of the UE; means for transmitting scheduling information for a communication for the UE, wherein the scheduling information is based at least in part on the one or more respective maximum ranks; means for transmitting information indicating respective maximum allowable ranks for the one or more TCI states of the UE; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may communicate with one or more transmit-receive points (TRPs) using two or more transmission configuration indicator (TCI) states. A TCI state may indicate a configuration for a beam, such as a quasi-colocation relationship to be used for the beam, spatial information associated with the beam, and/or the like. The UE may communicate with one TRP (e.g., different antenna panels or antenna groups of the TRP) using two or more TCI states, or may communicate with two or more TRPs using a set of TCI states for each TRP of the two or more TRPs. A communication using two or more TCI states may be referred to as a multi-TCI-state communication or a multi-TRP communication (even though the communication using two or more TCI states may be with a single TRP).

In some aspects, a communication with a TRP may carry multiple data streams, referred to as "layers." For example, a multiple-input multiple-output (MIMO) communication may have a single layer or may have multiple layers. The number of layers conveyed on a channel between a UE and a TRP is identified by the rank of the channel. For example, if the UE can support four layers in a communication, the UE may support a rank of four.

In a multi-TCI-state communication, the layers of the communication may be distributed in a variety of fashions. For example, consider a communication with a rank of four performed between a UE, a first TRP (TRP1) and a second TRP (TRP2). In this case, the set of possible layer distributions between the first TRP and the second TRP, expressed as [Layers$_{TRP1}$, Layers$_{TRP2}$], may be {[4 0] [3 1] [2 2] [1 3] [4 0]}. For example, [2 2] may indicate that two layers are transmitted by the first TRP and two layers are transmitted by the second TRP. Similar layer distributions can be used for communications with ranks of three, two, and one.

The use of analog beamforming, such as in NR Frequency Range 2 (FR2, described above) may impose certain limitations on the rank distribution over multiple TRPs. For example, each analog beam may support a limited number of layers per beam (e.g., based at least in part on the UE's RF chain and how antenna elements (e.g., analog ports) are mapped to digital ports). As a particular example, assume that each TRP uses an analog beam that can support two layers. In this case, for a rank of four, the set of possible layer distributions, expressed as [Layers$_{TRP1}$, Layers$_{TRP2}$], may be {[2 2]}. For a rank of three, the set of possible layer distributions, expressed as [Layers$_{TRP1}$, Layers$_{TRP2}$], may be {[2 1] [1 2]}. Similar layer distributions can be used for communications with ranks of two and one. As another particular example, when each TRP uses an analog beam that can support three layers, for a rank of four, the set of possible layer distributions, expressed as [Layers$_{TRP1}$, Layers$_{TRP2}$], may be {[3 1] [2 2] [1 3]}.

A UE may be configured with a plurality of possible TCI states. Some TCI states may be configured as default TCI states. Downlink control information (DCI) may be used to indicate one or more TCI states to be used for an analog beam (e.g., using a TCI field of the DCI). For example, in some circumstances, DCI can be used to dynamically switched a TCI state using the TCI field, whereas in other circumstances, the TCI state cannot be dynamically switched (e.g., due to limitations on switching time). When dynamic switching of the TCI state is not supported, the UE may use one or more of the default TCI states configured for the UE. This is described in more detail in connection with FIG. 3.

The usage of default TCI states when dynamic switching of the TCI state is not supported may impose certain limits on the rank distribution over multiple TRPs. For example, a base station may schedule a communication with the UE using a set of default TCI states. However, the base station may be constrained with regard to how layers of the communication can be distributed among two or more TRPs or two or more TCI states. For example, a distribution may be disallowed because the distribution is not compatible with a default TCI state, or a distribution may not be usable for a UE based at least in part on capabilities of the UE, channel conditions of the UE, and/or the like. If the base station schedules traffic with a layer distribution that is unusable or disallowed for the UE, then computing resources may be consumed due to dropped traffic, insufficient performance of the communication, and/or the like.

Techniques and apparatuses described herein provide for a UE to indicate a maximum rank per TCI state of a default TCI state set. In some aspects, this maximum rank may be a maximum possible rank of the UE (e.g., a maximum rank supported by the UE for the default TCI state). In some aspects, a base station may receive the maximum rank per TCI state, and may indicate a maximum allowable rank per TCI state (e.g., a maximum rank for the TCI state that can be requested by the UE). The maximum rank and/or the maximum allowable rank may be used when dynamic switching of the TCI state is not allowed, such as when the UE is using the set of default TCI states. The UE may provide a channel state information (CSI) report in accordance with the maximum rank and/or the maximum allowable rank, and a BS may schedule a communication in accordance with the maximum rank and/or the maximum possible rank. For example, a layer distribution of the communication may not exceed the maximum ranks or the maximum possible ranks indicated by the UE and the BS.

In this way, the UE and the BS may determine a maximum rank and/or a maximum allowable rank for default TCI states of the UE. This may reduce or eliminate the occurrence of scheduling a communication with a layer distribution that is unusable or suboptimal for the UE, thereby improving the performance of multi-TRP or multi-TCI-state communications and improving utilization of computing resources.

Figure 3:
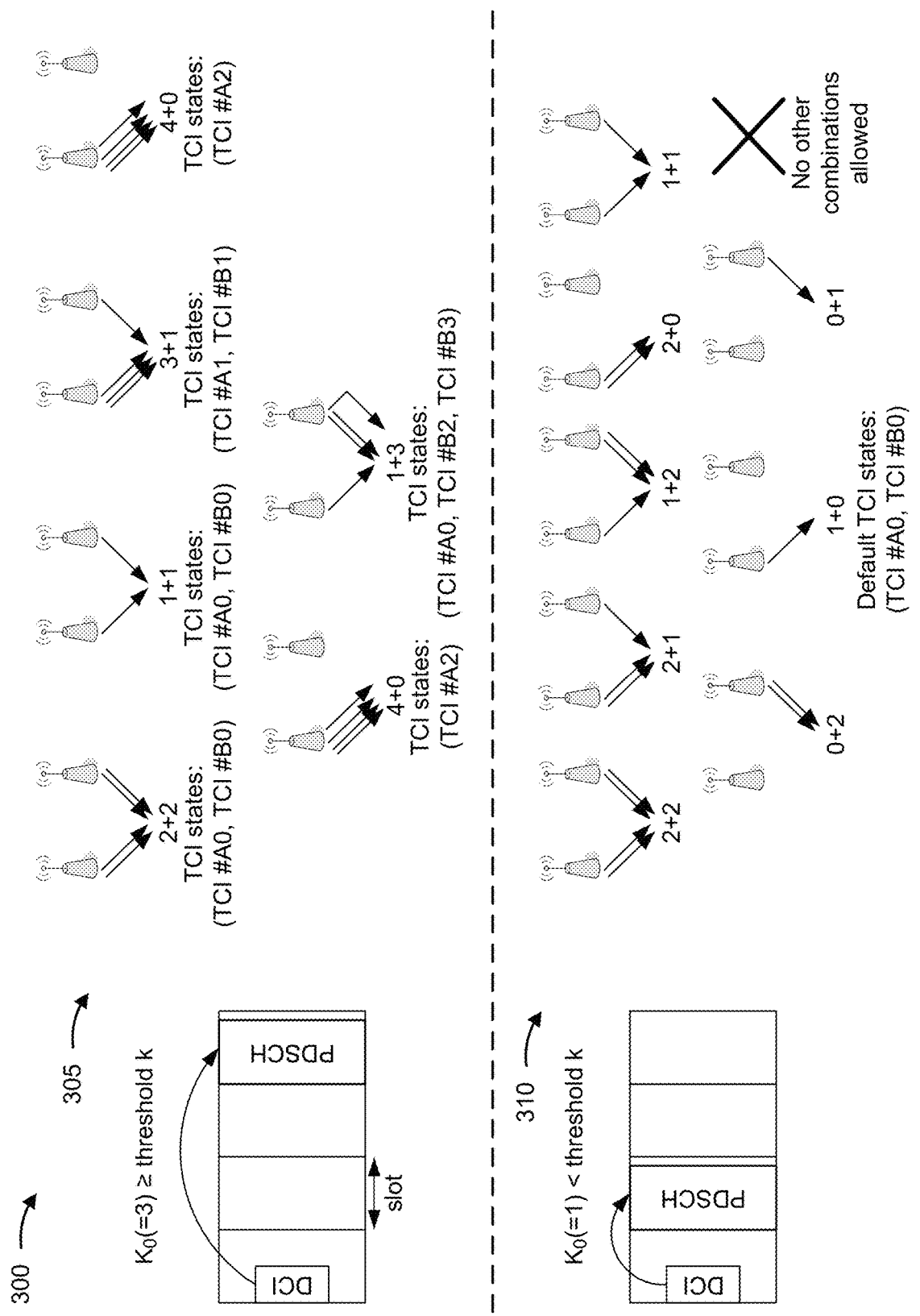
FIG. 3 is a diagram illustrating an example of layer distributions for pairs of TCI states, in accordance with various aspects of the present disclosure.

FIG. 3 is a diagram illustrating an example 300 of layer distributions for pairs of TCI states, in accordance with various aspects of the present disclosure.

FIG. 3 shows a first scenario 305 in which dynamic switching of TCI states is permitted and a second scenario 310 in which dynamic switching of TCI states is not permitted. In the first scenario 305, a slot offset K$_0$ satisfies a threshold k. The threshold k may be an integer and may identify a number of slots. Here, the threshold k is 2 slots. The slot offset K$_0$ may be an offset, in terms of slots, between a DCI and a PDSCH scheduled by the DCI. In some aspects, K$_0$ may be referred to as a slot offset. If K$_0$ is greater than k, then a base station can dynamically switch TCI states using the TCI field of the DCI, since the UE has sufficient time to perform the switch before the corresponding PDSCH is received. In this case, any combination of layer distribution can be used, as long as the layer distribution is supported by the analog beam pairs corresponding to the assigned TCI states. Examples of such combinations of layer distributions are shown.

In the second scenario 310, K$_0$ fails to satisfy k. In this case, the UE may not have sufficient time to switch TCI states dynamically. Therefore, a base station may use one or more of the default TCI states shown in connection with the second scenario 310, and may not be allowed to use TCI states other than the one or more default TCI states. In this case, the TCI field of the DCI may be ignored by the UE and/or the base station. As described in connection with FIG. 4, the UE may provide information indicating a maximum rank for one or more of the default TCI states shown in FIG. 3. The base station may schedule communications with the UE in accordance with the maximum rank and/or a maximum allowable rank determined by the base station. Thus, efficiency of communications between the base station and the UE may be improved, thereby improving utilization of computing resources.

As indicated above, FIG. 3 is provided as an example. Other examples may differ from what is described with respect to FIG. 3.

Figure 4:
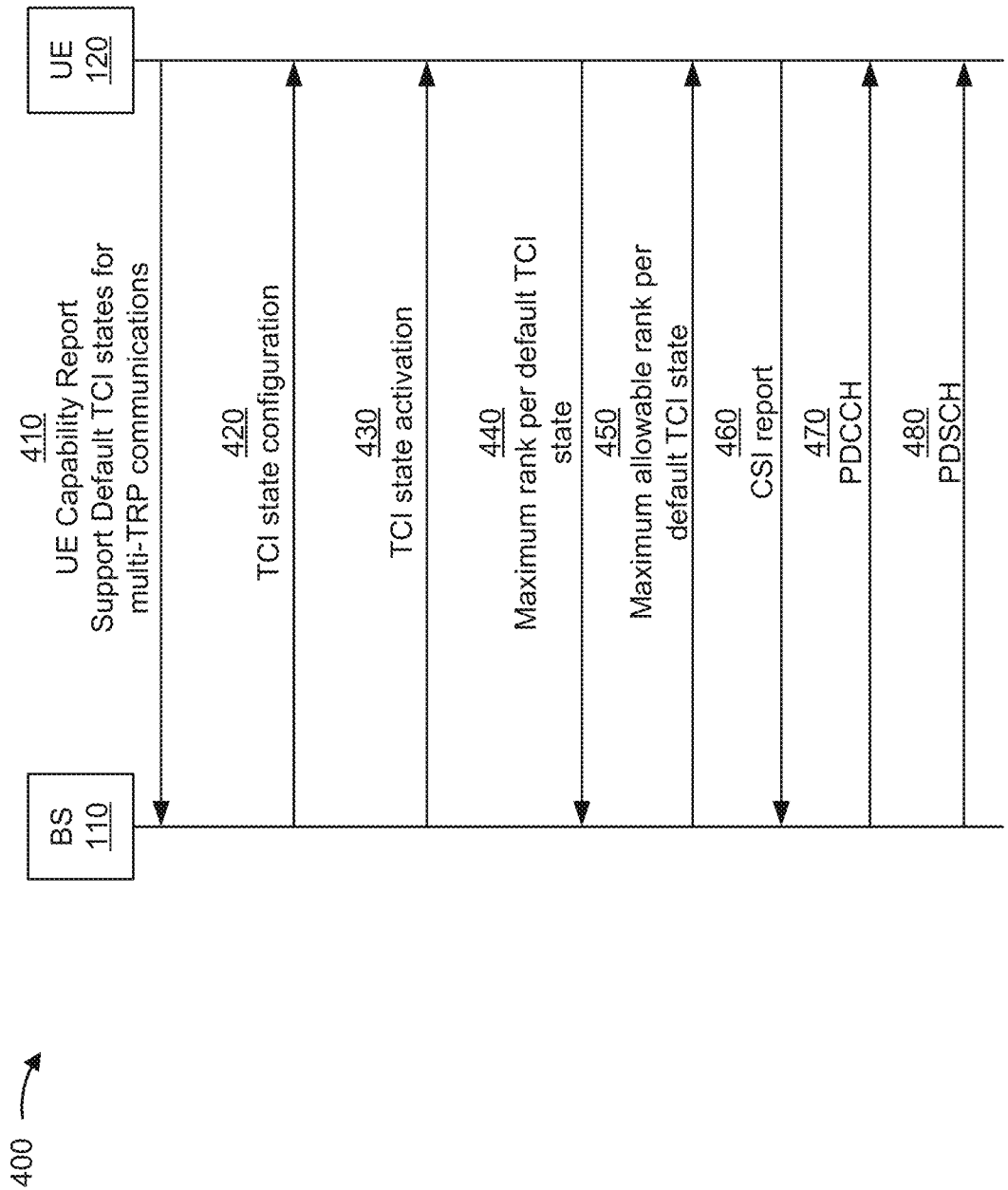
FIG. 4 is a diagram illustrating an example of signaling a maximum rank for one or more TCI states.

FIG. 4 is a diagram illustrating an example 400 of signaling a maximum rank for one or more TCI states. As shown, FIG. 4 includes a BS 110 and a UE 120.

As shown in FIG. 4, and by reference number 410, the UE 120 may provide UE capability information (e.g., a UE capability report and/or the like) to the BS 110. The UE capability information may indicate whether the UE 120 supports a set of default TCI states for multi-TRP communication.

As shown by reference number 420, the BS 110 may configure a plurality of TCI states for the UE 120. For example, the BS 110 may provide configuration information (e.g., radio resource control (RRC) information and/or the like) that configures a plurality of TCI states. The plurality of TCI states may include a set of default TCI states. The UE 120 and the BS 110 may use one or more default TCI states of the set of default TCI states when the slot offset K$_0$ fails to satisfy a threshold k, as described in connection with the second scenario 310 of FIG. 3.

As shown by reference number 430, the BS 110 may activate one or more TCI states of the plurality of TCI states. For example, the BS 110 may activate the one or more TCI states using a medium access control control element (MAC-CE) and/or the like. The one or more TCI states may include one or more default TCI states of the plurality of TCI states. The BS 110 may switch the UE 120 between activated TCI states using DCI, and the UE 120 may use the one or more default TCI states when the slot offset K$_0$ fails to satisfy the threshold k.

As shown by reference number 440, the UE 120 may provide information indicating a maximum rank per default TCI state, of the one or more default TCI states activated by the BS 110. In some aspects, the UE 120 may provide a respective maximum rank for each activated default TCI state. In some aspects, the UE 120 may provide a maximum rank for a group of multiple default TCI states, such as all default TCI states or a subset of default TCI states. In other words, the maximum ranks and the default TCI states may have a one-to-one, a many-to-one, a one-to-many, or a many-to-many correspondence. In some aspects, the UE 120 may determine a maximum rank based at least in part on a beam type (e.g., a type indicating a width of a beam, such as whether a beam is a wide or a narrow beam) used for the communication link between the UE 120 and the BS 110, a capability of the UE 120, a battery condition of the UE 120, a channel condition of the UE 120, a buffer status of the UE 120, and/or the like. The information shown by reference number 440 may be provided using RRC signaling, a MAC-CE, uplink control information, and/or the like.

As shown by reference number 450, the BS 110 may provide information indicating a maximum allowable rank for one or more default TCI states. The maximum allowable rank may indicate a maximum rank that the UE 120 can use when determining CSI feedback, and that the BS 110 can use when scheduling a communication with the UE 120. For example, when $K_0$ fails to satisfy the threshold k, the UE 120 may determine the CSI feedback, and the BS 110 may schedule the communication, on one or more default TCI states in accordance with the maximum rank and the maximum allowable rank for the one or more default TCI states. In some aspects, the BS 110 may not provide the information indicating the maximum allowable rank, which may conserve computing resources of the BS 110 relative to determining and providing the maximum allowable rank. In some aspects, the maximum allowable rank for a default TCI state may be less than or equal to the maximum rank (determined by the UE 120) for the default TCI state. The information indicating the maximum allowable rank may be provided using DCI, RRC signaling, a MAC-CE, and/or the like.

As shown by reference number 460, the UE 120 may provide a CSI report to the BS 110. The CSI report may indicate CSI feedback for a channel between the UE 120 and one or more TRPs to be used for a multi-TRP communication. For example, the CSI report may include rank indicators for the one or more TRPs. The UE 120 may determine the rank indicators in accordance with the maximum rank and/or the maximum allowable rank for one or more default TCI states corresponding to one or more CSI reference signals used to determine the CSI feedback. Thus, the UE 120 may not request a rank on a default TCI state that exceeds the maximum rank or the maximum allowable rank.

As shown by reference number 470, the BS 110 may provide a physical downlink control channel (PDCCH) to the UE 120. The PDCCH may include scheduling information that indicates a layer distribution among two or more TCI states and/or two or more TRPs. When the slot offset $K_0$ satisfies the threshold k, then the PDCCH may not necessarily conform to the maximum ranks or the maximum allowable ranks. In this case, the total rank over all TRPs or TCI states may be configured not to exceed a capability of the UE 120. When the slot offset $K_0$ fails to satisfy the threshold k, then the layer distribution for the two or more TCI states (which may be default TCI states due to the slot offset $K_0$ failing to satisfy the threshold k) may satisfy the maximum rank and/or the maximum allowable rank (if the maximum allowable rank is configured). If the slot offset $K_0$ fails to satisfy the threshold k, and if the rank on a TCI state indicated by the PDCCH exceeds the maximum rank or the maximum allowable rank, then the UE 120 may treat the PDCCH as invalid signaling. As shown by reference number 480, the UE 120 may receive a physical downlink shared channel (PDSCH) associated with the PDCCH. For example, the UE 120 may receive the PDSCH from one or more TRPs using two or more TCI states, as described above. As used herein, treating signaling as invalid signaling may include disregarding the signaling, performing no action based at least in part on the signaling, skipping monitoring of a resource indicated by the signaling, determining not to implement a configuration or other information indicated by the signaling, or the like.

As indicated above, FIG. 4 is provided as an example. Other examples may differ from what is described with respect to FIG. 4.

Figure 5:
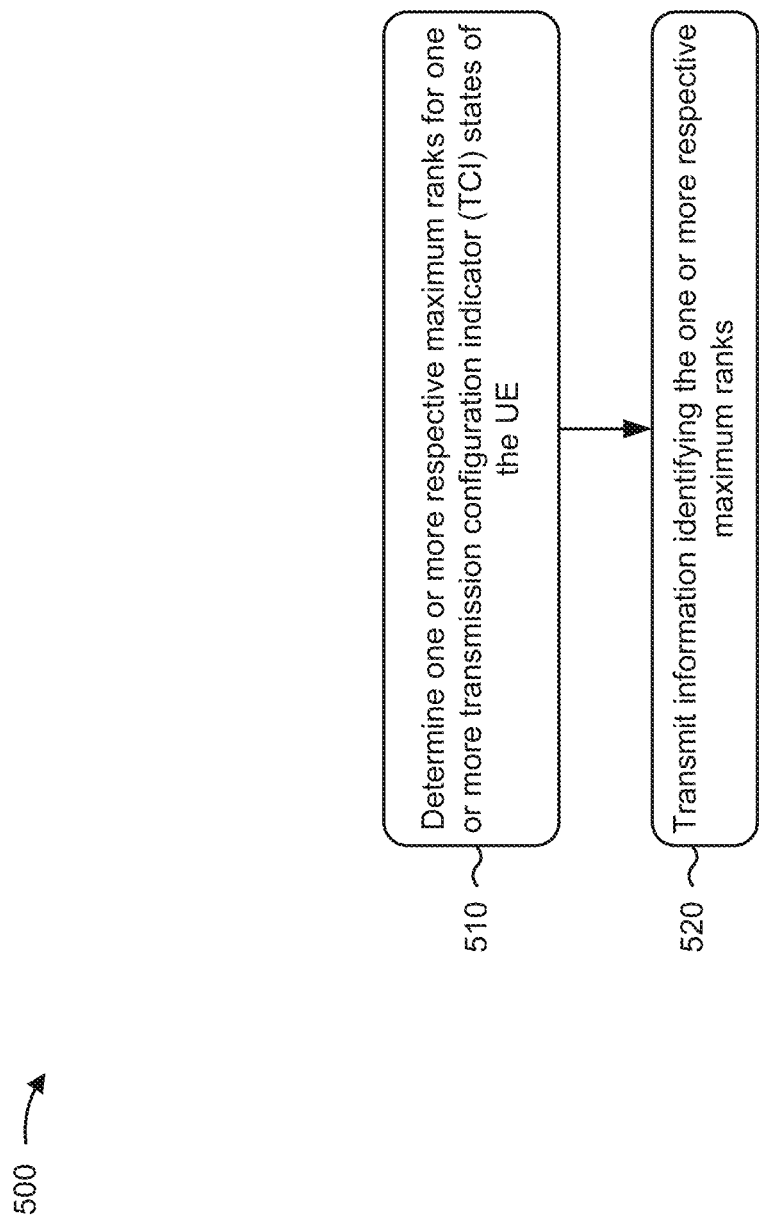
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with reporting a maximum rank for a multi transmit-receive point configuration.

As shown in FIG. 5, in some aspects, process 500 may include determining one or more respective maximum ranks for one or more transmission configuration indicator (TCI) states of the UE (block 510). For example, the UE (e.g., using controller/processor 280 and/or the like) may determine one or more respective maximum ranks for one or more TCI states of the UE, as described above.

As further shown in FIG. 5, in some aspects, process 500 may include transmitting information identifying the one or more respective maximum ranks (block 520). For example, the UE (e.g., using controller/processor 280, transmit processor 264, TX MIMO processor 266, MOD 254, antenna 252, and/or the like) may transmit information identifying the one or more respective maximum ranks, as described above.

Process 500 may include additional aspects, such as any single aspect or any combination of aspects described below and/or in connection with one or more other processes described elsewhere herein.

In a first aspect, the one or more TCI states are one or more default TCI states of the UE.

In a second aspect, alone or in combination with the first aspect, process 500 includes receiving information indicating respective maximum allowable ranks for the one or more TCI states of the UE.

In a third aspect, alone or in combination with one or more of the first and second aspects, the information indicating the respective maximum allowable ranks is received using at least one of downlink control information, radio resource control signaling, or a medium access control control element.

In a fourth aspect, alone or in combination with one or more of the first through third aspects, process 500 includes receiving scheduling information for a communication with a slot offset that fails to satisfy a threshold, wherein the communication is associated with two or more TCI states, and wherein each TCI state, of the two or more TCI states, has a rank that satisfies the one or more respective maximum ranks and the respective maximum allowable ranks.

In a fifth aspect, alone or in combination with one or more of the first through fourth aspects, process 500 includes receiving scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks or a corresponding maximum allowable rank for the TCI state; and treating the scheduling information as invalid based at least in part on the TCI state having the rank that exceeds the corresponding maximum rank or the corresponding maximum allowable rank.

In a sixth aspect, alone or in combination with one or more of the first through fifth aspects, the one or more respective maximum ranks indicate respective maximum ranks for all default TCI states of a default TCI state set of the UE.

In a seventh aspect, alone or in combination with one or more of the first through sixth aspects, the information identifying the one or more respective maximum ranks is transmitted using at least one of uplink control information, radio resource control signaling, or a medium access control control element.

In an eighth aspect, alone or in combination with one or more of the first through seventh aspects, process 500 includes receiving scheduling information for a communication with a slot offset that fails to satisfy a threshold, wherein the communication is associated with two or more TCI states, and wherein each TCI state, of the two or more TCI states, has a rank that satisfies the one or more respective maximum ranks; and receiving the communication based at least in part on the scheduling information.

In a ninth aspect, alone or in combination with one or more of the first through eighth aspects, process 500 includes receiving scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks; and treating the scheduling information as invalid based at least in part on the TCI state having the rank that exceeds the corresponding maximum rank.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
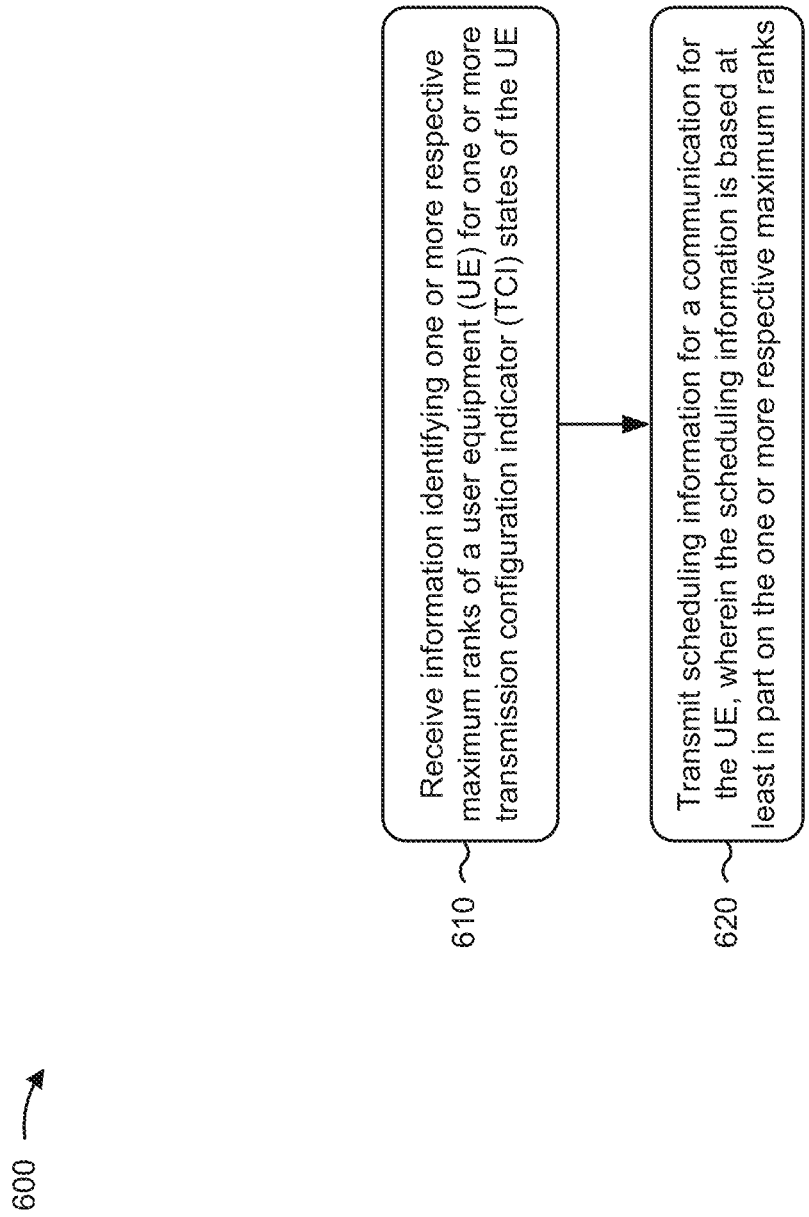
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., BS 110 and/or the like) performs operations associated with reporting a rank capability for multi transmit-receive point configuration.

As shown in FIG. 6, in some aspects, process 600 may include receiving information identifying one or more respective maximum ranks of a UE for one or more TCI states of the UE (block 610). For example, the base station (e.g., using antenna 234, DEMOD 232, MIMO detector 236, receive processor 238, controller/processor 240, and/or the like) may receive information identifying one or more respective maximum ranks of a UE for one or more TCI states of the UE, as described above.

As further shown in FIG. 6, in some aspects, process 600 may include transmitting scheduling information for a communication for the UE, wherein the scheduling information is based at least in part on the one or more respective maximum ranks (block 620). For example, the base station (e.g., using controller/processor 240, transmit processor 220, TX MIMO processor 230, MOD 232, antenna 234, and/or the like) may transmit scheduling information for a communication for the UE, as described above. In some aspects, the scheduling information is based at least in part on the one or more respective maximum ranks.

Process 600 may include additional aspects, such as any single aspect or any combination of aspects described below and/or in connection with one or more other processes described elsewhere herein.

In a first aspect, the one or more TCI states comprise one or more default TCI states.

In a second aspect, alone or in combination with the first aspect, process 600 includes transmitting information indicating respective maximum allowable ranks for the one or more TCI states of the UE.

In a third aspect, alone or in combination with one or more of the first and second aspects, the information indicating the respective maximum allowable ranks is transmitted using at least one of downlink control information, radio resource control signaling, or a medium access control control element.

In a fourth aspect, alone or in combination with one or more of the first through third aspects, the communication has a slot offset that fails to satisfy a threshold, the communication is associated with two or more TCI states, and each TCI state, of the two or more TCI states, has a rank that satisfies the one or more respective maximum ranks and the respective maximum allowable ranks.

In a fifth aspect, alone or in combination with one or more of the first through fourth aspects, the one or more respective maximum ranks include respective maximum ranks for all default TCI states of a default TCI state set of the UE.

In a sixth aspect, alone or in combination with one or more of the first through fifth aspects, the information identifying the one or more respective maximum ranks is transmitted using at least one of uplink control information, radio resource control signaling, or a medium access control control element.

In a seventh aspect, alone or in combination with one or more of the first through sixth aspects, the communication has a slot offset that fails to satisfy a threshold, the communication is associated with two or more TCI states, and each TCI state, of the two or more TCI states, has a rank that satisfies the one or more respective maximum ranks.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
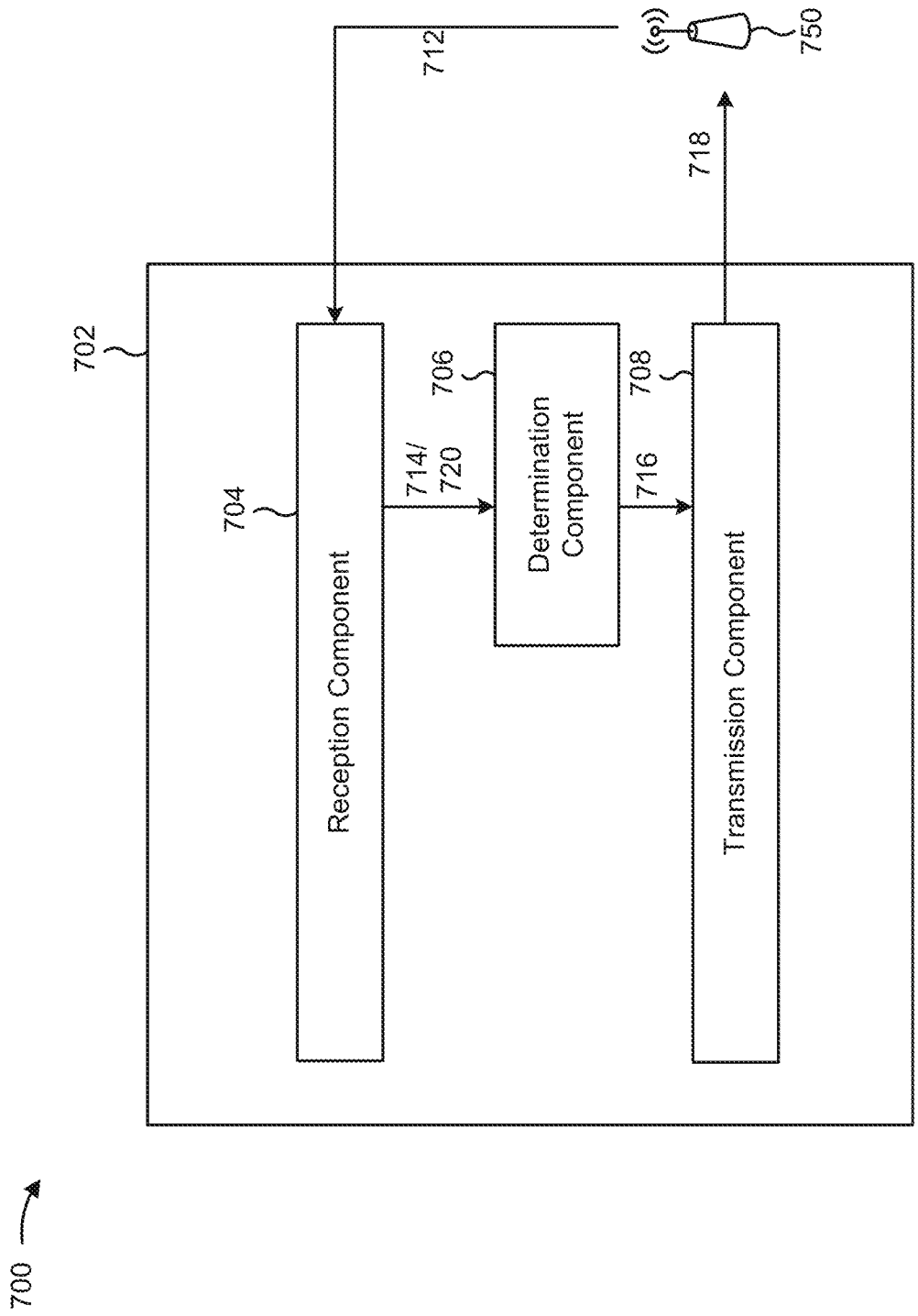
FIGS. 7 and 8 are conceptual data flow diagrams illustrating data flow between different modules/means/components in example apparatuses, in accordance with various aspects of the present disclosure.

FIG. 7 is a conceptual data flow diagram 700 illustrating data flow between different modules/means/components in an example apparatus 702. The apparatus 702 may be a UE (e.g., UE 120). In some aspects, the apparatus 702 includes a reception component 704, a determination component 706, and/or a transmission component 708.

The reception component 704 may receive signals 712 from a BS 750. The signals 712 may include information indicating or configuring a plurality of TCI states, a MAC-CE activating a set of TCI states, a maximum allowable rank for a TCI state, a PDCCH, a PDSCH, a CSI reference signal, and/or the like.

The determination component 706 may determine a maximum rank for one or more TCI states, such as one or more default TCI states. In some aspects, the determination component 706 may perform this determination based at least in part on data 714 received from the reception component 704. For example, the data 714 may include information regarding channel conditions, which TCI states are activated, and/or the like. The determination component 706 may provide data 716 to the transmission component 708. The data 716 may indicate one or more maximum ranks. The transmission component 708 may transmit information identifying the one or more maximum ranks to the BS 750 as signals 718.

In some aspects, the reception component 704 may provide data 720 to the determination component 706. The data 720 may include scheduling information for a communication with a slot offset that fails to satisfy a threshold, wherein the communication is associated with two or more TCI states, and wherein a TCI state, of the two or more TCI states, has a rank that exceeds a corresponding maximum rank indicated by the one or more respective maximum ranks or a corresponding maximum allowable rank for the TCI state. The determination component 706 may treat the scheduling information as invalid based at least in part on the TCI state having the rank that exceeds the corresponding maximum rank or the corresponding maximum allowable rank.

The apparatus 702 may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

Figure 8:
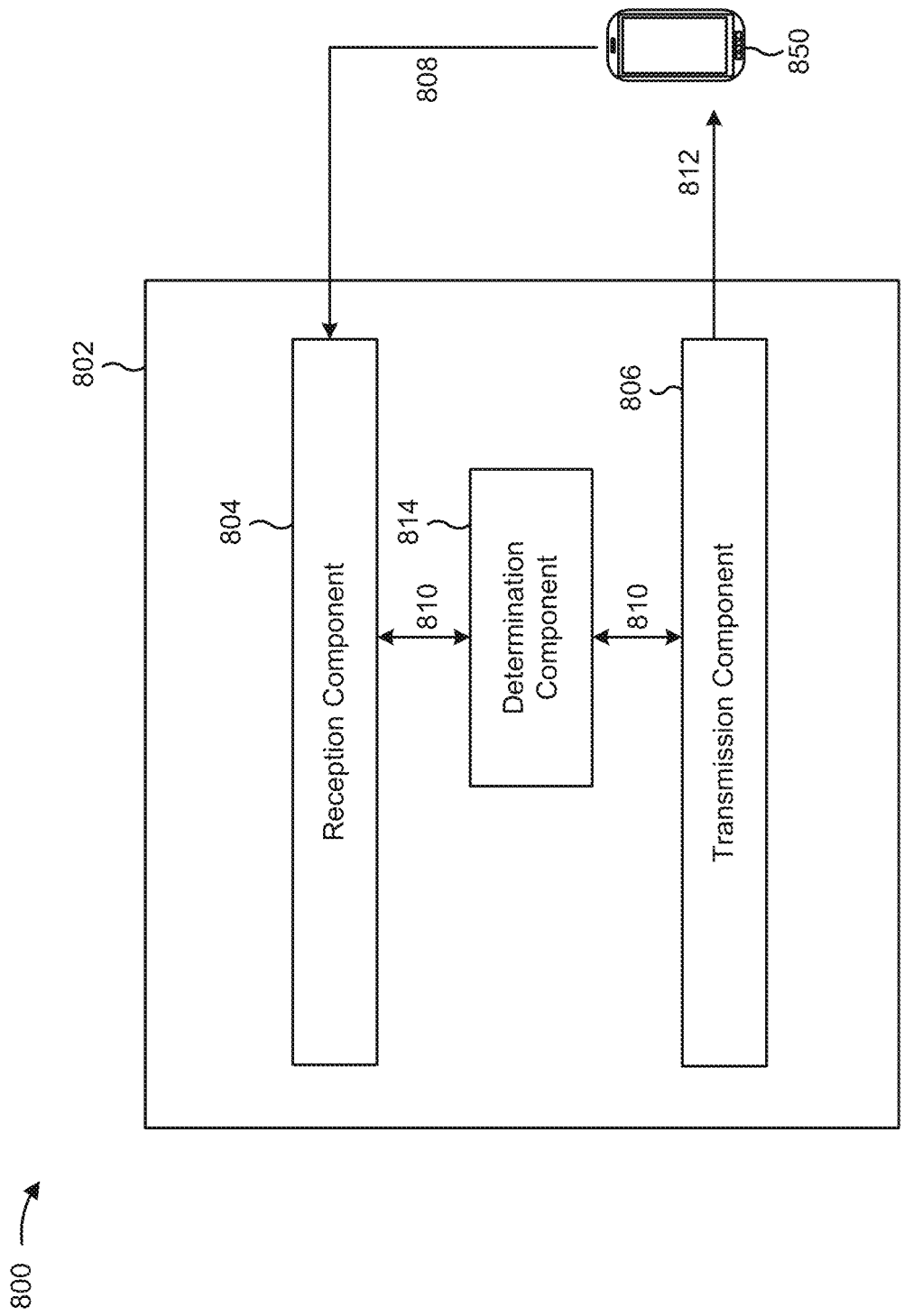

FIG. 8 is a conceptual data flow diagram 800 illustrating data flow between different modules/means/components in an example apparatus 802. The apparatus 802 may be a BS (e.g., BS 110). In some aspects, the apparatus 802 includes a reception component 804 and/or a transmission component 806. In some aspects, the apparatus 802 includes a determination component 814.

The reception component 804 may receive signals 808 from a UE 850. The signals 808 may include information identifying one or more respective maximum ranks for one or more TCI states of the UE 850. The reception component 804 may provide data 810 to the transmission component 806 indicating the one or more respective maximum ranks. The transmission component 806 may transmit signals 812 to the UE 850. The signals 812 may include scheduling information for a communication for the UE 850, wherein the scheduling information is based at least in part on the one or more respective maximum ranks. In some aspects, the signals 812 may include information indicating respective maximum allowable ranks for the one or more TCI states of the UE 850. In some aspects, the determination component 814 of the apparatus 802 may determine the respective maximum allowable ranks and/or the scheduling information, for example, based at least in part on the data 810.

The apparatus 802 may include additional components that perform each of the blocks of the algorithm in the aforementioned process 600 of FIG. 6 and/or the like. Each block in the aforementioned process 600 of FIG. 6 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
a memory; and
one or more processors configured to:
determine maximum possible ranks for a plurality of transmission configuration indicator (TCI) states of the UE,
wherein the plurality of TCI states includes a first TCI state having a first maximum possible rank of the maximum possible ranks and a second TCI state having a second maximum possible rank of the maximum possible ranks,
wherein the first maximum possible rank is a maximum rank supported by the UE for the first TCI state, and
wherein the first TCI state further has a maximum allowable rank that is a maximum rank for the first TCI state that can be requested by the UE; and
transmit information identifying the maximum possible ranks.

2. The UE of claim 1, wherein the plurality of TCI states are default TCI states of the UE.

3. The UE of claim 1, wherein the one or more processors are further configured to:
receive information indicating respective maximum allowable ranks for the plurality of TCI states,
wherein the respective maximum allowable ranks include the maximum allowable rank.

4. The UE of claim 3, wherein the information indicating the respective maximum allowable ranks is received using at least one of:
downlink control information,
radio resource control signaling, or
a medium access control control element.

5. The UE of claim 3, wherein the one or more processors are further configured to:
receive scheduling information for a communication with a slot offset that fails to satisfy a threshold, wherein the communication is associated with two or more TCI states of the plurality of TCI states, and wherein each TCI state, of the two or more TCI states, has a rank that satisfies the maximum possible ranks and the respective maximum allowable ranks.

6. The UE of claim 3, wherein the one or more processors are further configured to:
receive scheduling information for a communication with a slot offset that fails to satisfy a threshold, wherein the communication is associated with two or more TCI states of the plurality of TCI states, and wherein a TCI state, of the two or more TCI states, has a rank that exceeds a corresponding maximum rank indicated by the maximum possible ranks or a corresponding maximum allowable rank for the TCI state; and
treat the scheduling information as invalid based at least in part on the TCI state having the rank that exceeds the corresponding maximum rank or the corresponding maximum allowable rank.

7. The UE of claim 1, wherein the maximum possible ranks indicate respective maximum ranks for all default TCI states of a default TCI state set of the UE.

8. The UE of claim 1, wherein the information identifying the maximum possible ranks is transmitted using at least one of:
uplink control information,
radio resource control signaling, or
a medium access control control element.

9. The UE of claim 1, wherein the one or more processors are further configured to:
receive scheduling information for a communication with a slot offset that fails to satisfy a threshold, wherein the communication is associated with two or more TCI states of the plurality of TCI states, and wherein each TCI state, of the two or more TCI states, has a rank that satisfies the maximum possible ranks; and
receive the communication based at least in part on the scheduling information.

10. The UE of claim 1, wherein the one or more processors are further configured to:
receive scheduling information for a communication with a slot offset that fails to satisfy a threshold, wherein the communication is associated with two or more TCI states of the plurality of TCI states, and wherein a TCI state, of the two or more TCI states, has a rank that exceeds a corresponding maximum rank indicated by the maximum possible ranks; and
treat the scheduling information as invalid based at least in part on the TCI state having the rank that exceeds the corresponding maximum rank.

11. A network entity for wireless communication, comprising:
a memory; and
one or more processors configured to:
receive information identifying maximum possible ranks for a plurality of transmission configuration indicator (TCI) states of a user equipment (UE),
wherein the plurality of TCI states includes a first TCI state having a first maximum possible rank of the maximum possible ranks and a second TCI state having a second maximum possible rank of the maximum possible ranks,
wherein the first maximum possible rank is a maximum rank supported by the UE for the first TCI state, and
wherein the first TCI state further has a maximum allowable rank that is a maximum rank for the first TCI state that can be requested by the UE; and
transmit scheduling information for a communication for the UE, wherein the scheduling information is based at least in part on the maximum possible ranks.

12. The network entity of claim 11, wherein the plurality of TCI states comprise default TCI states.

13. The network entity of claim 11, wherein the one or more processors are further configured to:
transmit information indicating respective maximum allowable ranks for the plurality of TCI states,
wherein the respective maximum allowable ranks include the maximum allowable rank.

14. The network entity of claim 13, wherein the information indicating the respective maximum allowable ranks is transmitted using at least one of:

downlink control information,
radio resource control signaling, or
a medium access control control element.

15. The network entity of claim 13, wherein the communication has a slot offset that fails to satisfy a threshold, wherein the communication is associated with two or more TCI states of the plurality of TCI states, and wherein each TCI state, of the two or more TCI states, has a rank that satisfies the maximum possible ranks and the respective maximum allowable ranks.

16. The network entity of claim 11, wherein the maximum possible ranks include respective maximum ranks for all default TCI states of a default TCI state set of the UE.

17. The network entity of claim 11, wherein the information identifying the maximum possible ranks is transmitted using at least one of:
uplink control information,
radio resource control signaling, or
a medium access control control element.

18. The network entity of claim 11, wherein the communication has a slot offset that fails to satisfy a threshold, wherein the communication is associated with two or more TCI states of the plurality of TCI states, and wherein each TCI state, of the two or more TCI states, has a rank that satisfies a respective maximum rank of the maximum possible ranks.

19. A method of wireless communication performed by a user equipment (UE), comprising:
determining maximum possible ranks for a plurality of transmission configuration indicator (TCI) states of the UE,
wherein the plurality of TCI states includes a first TCI state having a first maximum possible rank of the maximum possible ranks and a second TCI state having a second maximum possible rank of the maximum possible ranks, and
wherein the first maximum possible rank is a maximum rank supported by the UE for the first TCI state, and
wherein the first TCI state further has a maximum allowable rank that is a maximum rank for the first TCI state that can be requested by the UE; and
transmitting information identifying the maximum possible ranks.

20. The method of claim 19, wherein the plurality of TCI states are default TCI states of the UE.

21. The method of claim 19, further comprising:
receiving information indicating respective maximum allowable ranks for the plurality of TCI states of the UE,
wherein the respective maximum allowable ranks include the maximum allowable rank.

22. The method of claim 21, further comprising:
receiving scheduling information for a communication with a slot offset that fails to satisfy a threshold, wherein the communication is associated with two or more TCI states of the plurality of TCI states, and wherein each TCI state, of the two or more TCI states, has a rank that satisfies the maximum possible ranks and the respective maximum allowable ranks.

23. The method of claim 21, further comprising:
receiving scheduling information for a communication with a slot offset that fails to satisfy a threshold, wherein the communication is associated with two or more TCI states of the plurality of TCI states, and wherein a TCI state, of the two or more TCI states, has a rank that exceeds a corresponding maximum rank indicated by the maximum possible ranks or a corresponding maximum allowable rank for the TCI state; and
treating the scheduling information as invalid based at least in part on the TCI state having the rank that exceeds the corresponding maximum rank or the corresponding maximum allowable rank.

24. The method of claim 19, wherein the maximum possible ranks indicate respective maximum ranks for all default TCI states of a default TCI state set of the UE.

25. The method of claim 19, further comprising:
receiving scheduling information for a communication with a slot offset that fails to satisfy a threshold, wherein the communication is associated with two or more TCI states of the plurality of TCI states, and wherein each TCI state, of the two or more TCI states, has a rank that satisfies the maximum possible ranks; and
receiving the communication based at least in part on the scheduling information.

26. The method of claim 19, further comprising:
receiving scheduling information for a communication with a slot offset that fails to satisfy a threshold, wherein the communication is associated with two or more TCI states of the plurality of TCI states, and wherein a TCI state, of the two or more TCI states, has a rank that exceeds a corresponding maximum rank indicated by the maximum possible ranks; and
treating the scheduling information as invalid based at least in part on the TCI state having the rank that exceeds the corresponding maximum rank.

27. A method of wireless communication performed by a network entity, comprising:
receiving information identifying maximum possible ranks for a plurality of transmission configuration indicator (TCI) states of a user equipment (UE),
wherein the plurality of TCI states includes a first TCI state having a first maximum possible rank of the maximum possible ranks and a second TCI state having a second maximum possible rank of the maximum possible ranks, wherein the first maximum possible rank is a maximum rank supported by the UE for the first TCI state, and
wherein the first TCI state further has a maximum allowable rank that is a maximum rank for the first TCI state that can be requested by the UE; and
transmitting scheduling information for a communication for the UE, wherein the scheduling information is based at least in part on the maximum possible ranks.

28. The method of claim 27, wherein the plurality of TCI states are default TCI states.

29. The method of claim 27, further comprising:
transmitting information indicating respective maximum allowable ranks for the plurality of TCI states,
wherein the respective maximum allowable ranks include the maximum allowable rank.

30. The method of claim 29, wherein the communication has a slot offset that fails to satisfy a threshold, wherein the communication is associated with two or more TCI states of the plurality of TCI states, and wherein each TCI state, of the two or more TCI states, has a rank that satisfies the maximum possible ranks and the respective maximum allowable ranks.

31. The UE of claim 1, wherein the first maximum possible rank is a maximum rank supported by the UE for the first TCI state.

32. The UE of claim 1, wherein the first maximum possible rank is different from the maximum allowable rank.

33. The UE of claim 1, wherein the maximum allowable rank is indicated by a network entity.

34. The method of claim 19, wherein the maximum allowable rank is indicated by a network entity.

* * * * *